US008531732B2

United States Patent
Park

(10) Patent No.: US 8,531,732 B2
(45) Date of Patent: Sep. 10, 2013

(54) IMAGE PROCESSING APPARATUS AND CONTROL METHOD TO SYNTHESIZE EXTRACTED PIXELS WITH HIGHEST CLEARNESS FOR A CLEAR PICTURE QUALITY

(75) Inventor: Ho Boem Park, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 1004 days.

(21) Appl. No.: 12/142,098

(22) Filed: Jun. 19, 2008

(65) Prior Publication Data

US 2009/0021804 A1 Jan. 22, 2009

(30) Foreign Application Priority Data

Jul. 16, 2007 (KR) .................................. 2007-71306

(51) Int. Cl.
*H04N 1/407* (2006.01)
*G06K 9/00* (2006.01)
*G03G 15/22* (2006.01)

(52) U.S. Cl.
USPC ........... 358/3.27; 358/1.9; 358/2.1; 358/1.18; 358/497; 382/112; 399/151

(58) Field of Classification Search
USPC .................. 358/3.27, 3.1, 496, 462, 1.9, 2.1, 358/1.11, 1.17, 1.18, 501, 505, 529, 532, 358/538, 401, 406, 408, 497; 382/112, 165, 382/175, 177, 179, 190, 191, 193, 195, 198; 399/15, 151, 183, 190, 191, 194, 363, 370
See application file for complete search history.

(56) References Cited

U.S. PATENT DOCUMENTS

| | | | | |
|---|---|---|---|---|
| 5,446,276 A | * | 8/1995 | Iyoda et al. | 250/208.1 |
| 5,999,646 A | * | 12/1999 | Tamagaki | 382/169 |
| 6,859,233 B1 | * | 2/2005 | Sasama | 348/349 |
| 6,975,352 B2 | * | 12/2005 | Seeger et al. | 348/218.1 |
| 7,053,953 B2 | * | 5/2006 | Belz et al. | 348/346 |
| 7,221,805 B1 | * | 5/2007 | Bachelder | 382/255 |
| 7,876,477 B2 | * | 1/2011 | Toma et al. | 358/474 |
| 7,949,153 B2 | * | 5/2011 | Ono | 382/106 |
| 2003/0216152 A1 | * | 11/2003 | Fukagawa | 455/557 |

FOREIGN PATENT DOCUMENTS

| | | |
|---|---|---|
| JP | 2000-165608 | 6/2000 |
| JP | 2001144962 | 5/2001 |
| JP | 2003256771 | 9/2003 |
| KR | 2003-86074 | 11/2003 |

* cited by examiner

*Primary Examiner* — Steven Kau
(74) *Attorney, Agent, or Firm* — Stanzione & Kim, LLP

(57) ABSTRACT

An image processing apparatus includes an image reading unit to read a plurality of different images from a single image at various focal distances, and an image processing unit to extract clear pixels from the read images to synthesize the extracted pixels. According to the apparatus and a method thereof, an image is scanned several times at various focal distances to extract pixels having a clear picture quality in each corresponding pixel or block, and a synthesized image including only the extracted pixels is generated, so that the construction of the image processing apparatus can be simplified and the manufacturing cost thereof can be minimized while a clear image is being obtained.

23 Claims, 12 Drawing Sheets

IMAGE PROCESSING APPARATUS AND CONTROL METHOD TO SYNTHESIZE EXTRACTED PIXELS WITH HIGHEST CLEARNESS FOR A CLEAR PICTURE QUALITY

CROSS-REFERENCE TO RELATED APPLICATIONS

This application claims the benefit and priority under 35 U.S.C. §119(a) from Korean Patent Application No. 2007-71306, filed in the Korean Intellectual Property Office on Jul. 16, 2007, the disclosure of which is incorporated herein by reference in its entirety.

BACKGROUND OF THE INVENTION

1. Field of the Invention

The present general inventive concept relates generally to an image processing apparatus and a control method thereof, and more particularly, to an image processing apparatus and a control method thereof, which can improve the picture quality of a scanned image.

2. Description of the Related Art

An image processing apparatus reads an image recorded on a page (or possibly two) of a manuscript by irradiating light onto the page(s) of the manuscript to obtain the displayed information. For example, an image processing apparatus may include a scanner, a facsimile, a multifunctional device that performs functions of the scanner and the facsimile through a single device, a document translator, a computer for CAD (computer aided design), a character recognizer, a digital copier and the like.

In order to read the manuscript, a scanning unit must move or the manuscript must move. An image processing apparatus, in which a scanning unit moves, will be referred to as a flat-bed scanning type image processing apparatus. Further, an image processing apparatus, in which the manuscript moves, will be referred to as a sheet-feed scanning type image processing apparatus.

The flat-bed scanning type image processing apparatus includes a flat glass, on which the manuscript is put, and a scanning unit provided on the rear surface of the flat glass. The scanning unit includes a light source for irradiating light onto the manuscript, a plurality of mirrors for reflecting an optical signal reflected from the manuscript, a lens to collect the optical signal reflected from the mirrors, and an image sensor for converting the optical signal, which is transferred from the lens, into an electrical signal. Further, the scanning unit can scan a book as well as a sheet of a paper similarly to a general copier.

In such an image processing apparatus, the manuscript makes intimate contact with the surface of the flat glass installed on the upper surface of the body of the image processing apparatus. Thus, the focal distance for image scanning of the manuscript is fixed on the surface of the flat glass, so that a clear image can be obtained.

As illustrated in FIG. 1, when the manuscript is a three-dimensional object such as a thick book, since not all areas of the two scanned pages of the manuscript make intimate contact with the flat glass (especially the areas around the binding, i.e. the vertical center), the focal distance relative to a scanning area is not uniform, and the focal distance between a lens and the center of the book is lengthened (is located farther from the lens). Thus, a clear image may not be obtained due to mis-focusing. In the case of the center region of the book, characters become dim gradually due to the misalignment of the focal distance.

In order to avoid such problems, Japanese Unexamined Patent Publication No. 2000-165608 discloses technology in which two flat glasses having manuscript thereon are inclined at a predetermined angle, and two scanning units corresponding to the two flat glasses are provided on the rear surfaces of the two flat glasses, so that clear images can be obtained by scanning the left and right parts of a book, respectively.

However, since two flat glasses and two scanning units must be provided, the construction of an image processing apparatus is complicated and costly.

SUMMARY OF THE INVENTION

The present general inventive concept provides an image processing apparatus and control method thereof that is capable of obtaining clear images while simplifying the construction of the image processing apparatus regardless of the type of manuscript, and minimizing the manufacturing cost.

Additional aspects and/or utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing an image processing apparatus including an image reading unit to read a plurality of different images from a single image at various focal distances, and an image processing unit to extract clear pixels from the read images to synthesize the extracted pixels.

The foregoing and/or other aspects and utilities of the present general inventive concept may be achieved by providing an image processing apparatus including an image reading unit to read an image of manuscript according to a preset focal distance, a focal distance adjustment unit to adjust the focal distance of the image reading unit, an image storage unit to store a plurality of first images obtained by reading a single image at various focal distances, and an image processing unit to generate a second image obtained by extracting clear pixels from the first images and synthesizing the extracted pixels.

The foregoing and/or other aspects and utilities of the present general inventive concept may also be achieved by providing a method of an image processing apparatus, the method including reading a plurality of different first images from a single image at various focal distances, storing the first images, extracting clear pixels from the first images, generating a second image by synthesizing the extracted pixels, and storing the second image.

The foregoing and/or other aspects and utilities of the present general inventive concept may also be achieved by providing a computer readable storage medium containing an image processing method, the method including reading a plurality of different first images from a single image at various focal distances, storing the first images, extracting clear pixels from the first images and generating a second image by synthesizing the extracted pixels.

The foregoing and/or other aspects and utilities of the present general inventive concept may also be achieved by providing a method of processing an object image, the method including reading a plurality of different first images from an object image at various focal distances, storing the first images, extracting clear pixels from the first images and generating synthesized images from the first images, on the basis of spatial frequencies of corresponding pixels.

BRIEF DESCRIPTION OF THE DRAWINGS

These and/or other aspects and utilities of the exemplary embodiments of the present general inventive concept will become apparent and more readily appreciated from the following description of the embodiments, taken in conjunction with the accompanying drawings, in which:

FIGS. 10 to 12 are views illustrating a process of synthesizing images in each focal distance.

DETAILED DESCRIPTION OF THE PREFERRED EMBODIMENTS

Figure 1:
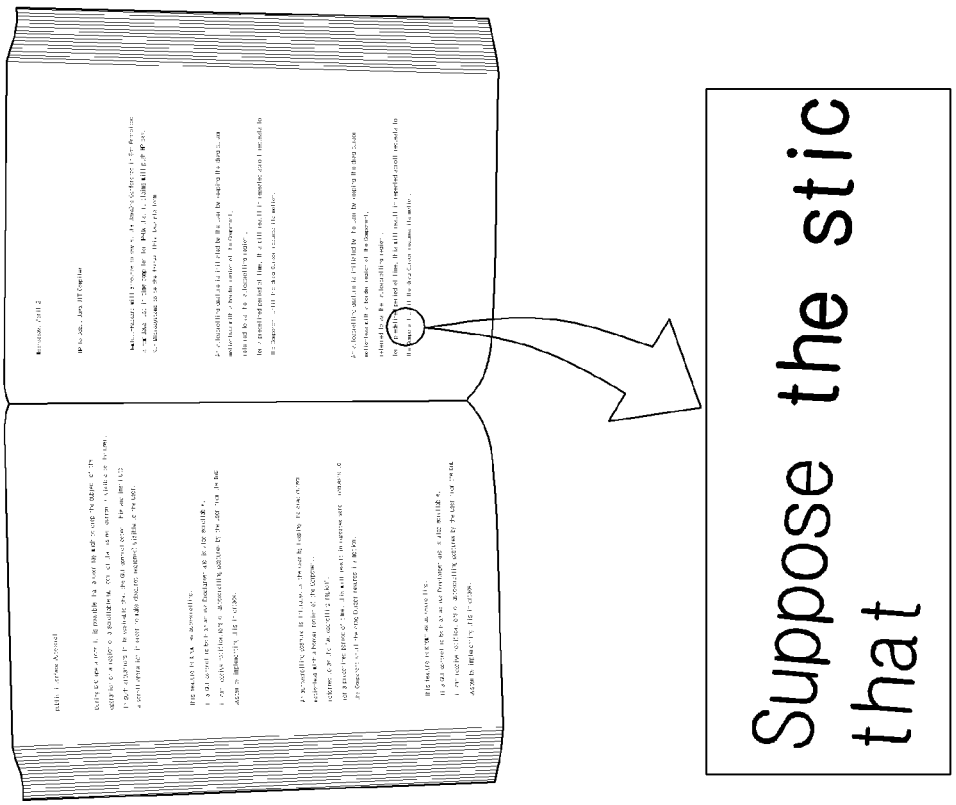
FIG. 1 is a view illustrating an image obtained by scanning a book in a conventional image processing apparatus.

Reference will now be made in detail to exemplary embodiments of the present general inventive concept, examples of which are illustrated in the accompanying drawings, wherein like reference numerals refer to like elements throughout. The embodiments are described below to explain the present general inventive concept by referring to the figures.

Figure 2:
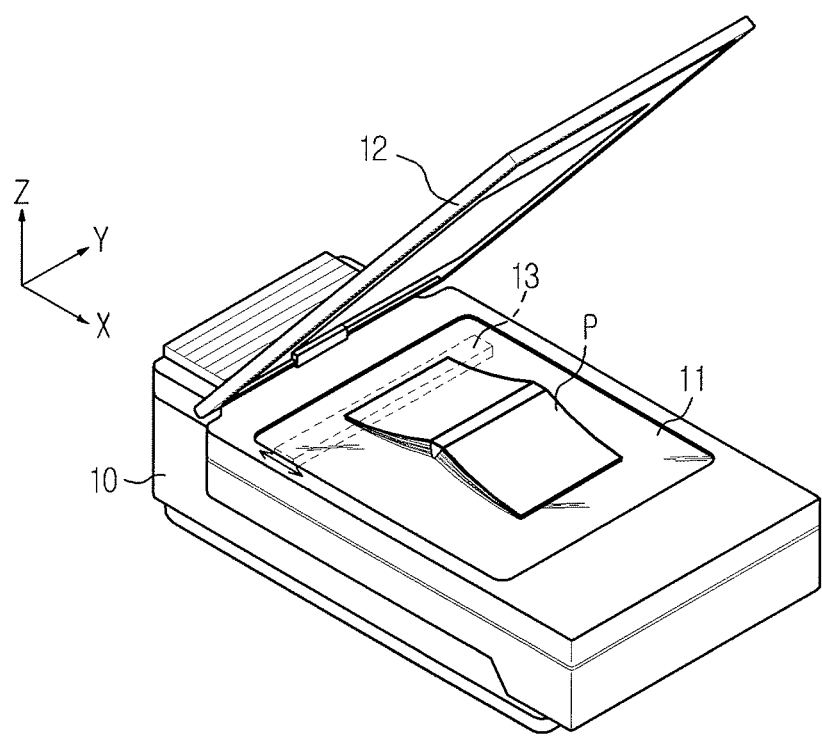
FIG. 2 is a perspective view illustrating an image processing apparatus according to an embodiment of the present general inventive concept.

As illustrated in FIG. 2, the image processing apparatus according to an embodiment of the present general inventive concept includes a body 10, a flat glass 11 provided on the body 10, and a cover 12, and a scanning unit 13. The cover 12 is rotatably installed at the body 10 to prevent external light from being incident into the flat glass 11 while a manuscript P (e.g. a book) on the flat glass 11 is being scanned or copied. The scanning unit 13 is provided on the rear surface of the flat glass 11 to read images recorded on the manuscript P. Although not illustrated in FIG. 2, the body 10 may further include a printing unit for printing images therein. The X-axis direction denotes a sub-scanning direction, in which the scanning unit 13 moves in order to read images. The Y-axis direction denotes a main scanning direction, in which the scanning unit 13 reads images of the manuscript P at the same time.

Figure 3:
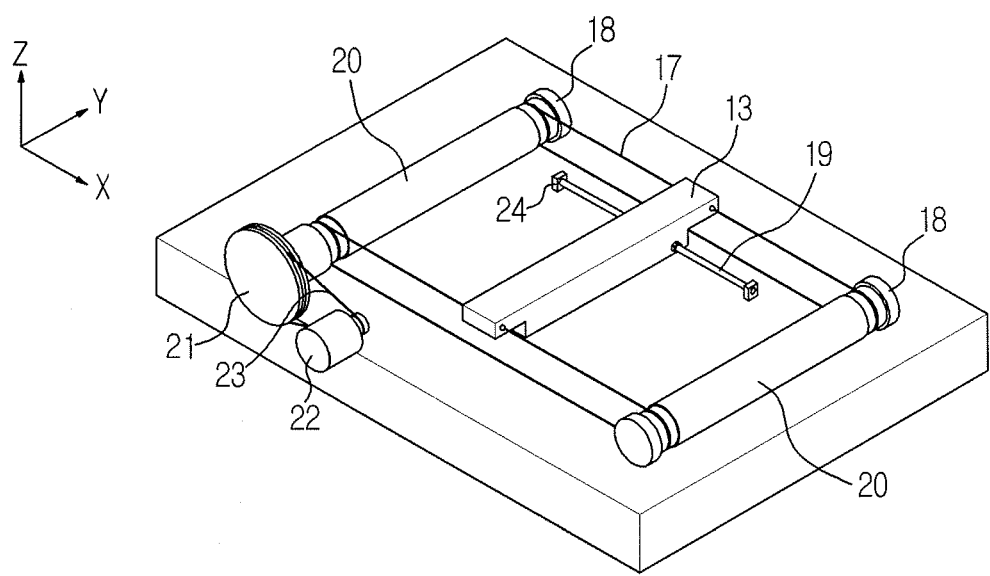
FIG. 3 is a perspective view illustrating the scanning unit of FIG. 2.
Figure 4:
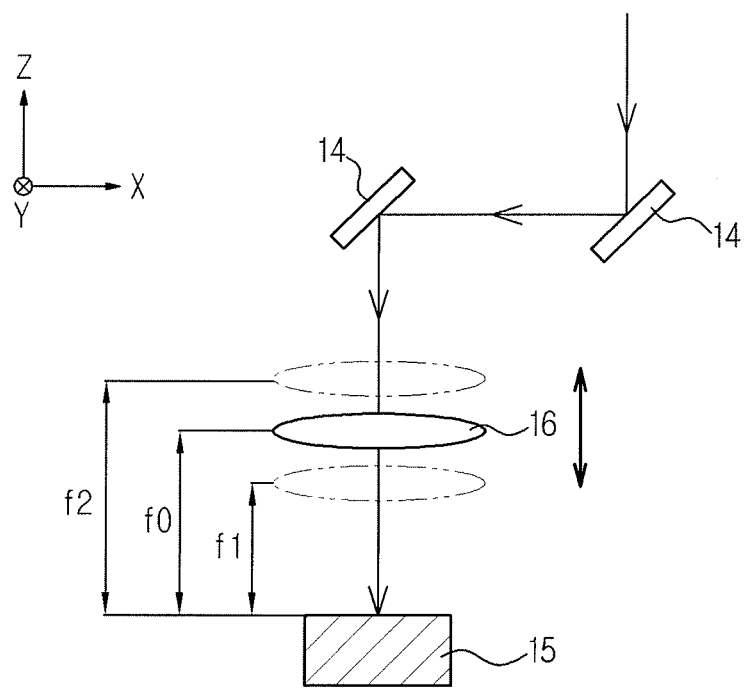
FIG. 4 is a schematic view illustrating certain elements of the scanning unit illustrated in FIG. 3.

FIG. 3 is a perspective view illustrating the scanning unit according to an embodiment of the present general inventive concept, and FIG. 4 is a schematic view illustrating the main elements of the scanning unit illustrated in FIG. 3. FIGS. 3 and 4 show aspects of the scanning unit 13, which irradiates light in the main scanning direction to scan images of the manuscript, and a driving unit.

As illustrated in FIGS. 3 and 4, the scanning unit 13 includes a plurality of mirrors 14, an image sensor 15 and a lens unit 16, which are integrally formed with a frame (not illustrated). The mirrors 14 reflect an optical signal reflected from the manuscript P after being irradiated from a light source. The lens unit 16 guides the optical signal, which is reflected from the mirrors 14, toward the image sensor 15. The image sensor 15 converts the optical signal into an electrical signal. The lens unit 16 moves upward and downward by a movable member (not illustrated). As the lens unit 16 moves upward and downward, the focal distance between the lens unit 16 and the image sensor 15 is varied, so that the images of the manuscript P can be scanned at each focal distance. When using the focal distance variable type hologram lens disclosed in Korean Unexamined Patent Publication No. 2003-86074, the focal distance can be varied by changing the intensity of electric field applied to the hologram area of the lens even without mechanically moving the lens upward and downward.

The manuscript P is put on the upper surface of the flat glass 11. The light, which is reflected from the manuscript P after being irradiated from a light source, contains image data of the manuscript P to be scanned. The optical signal is reflected by the mirrors 14 and then reaches the lens unit 16. The lens unit 16 focuses the optical signal incident from the mirrors 14 to send the optical signal to the image sensor 15. The image sensor 15 included in the scanning unit 13 may use a CCD (charge coupled device) sensor that converts an optical signal obtained by scanning the manuscript P into an electrical signal. Preferably, a large image processing apparatus capable of reading the manuscript P having a page size of more than A3, at a high speed, uses the CCD sensor having a relatively high resolution and focal depth.

The driving unit includes a pair of wires 17, wire pulleys 18, a guide shaft 19, wire pulley shafts 20, a driving pulley 21 and a driving motor 22. The wires 17 are coupled with both ends of the scanning unit 13 to slide the scanning unit 13 in the sub-scanning direction. The wires 17 are wound around the wire pulleys 18, respectively, to run endlessly. The wire pulleys 18 are interconnected through the wire pulley shafts 20 to move the wires 17 at the same speed. The guide shaft 19 guides X-axis sliding of the scanning unit 13. The driving pulley 21 is coupled with one of the wire pulley shafts 20. The driving pulley 21 receives driving force from a driving belt 23 connected to the driving motor 22 and transfers the driving force to the wire pulley shafts 20. Both ends of the guide shaft 19 are fixed to the body 10 through guide shaft holders 24.

Figure 5:
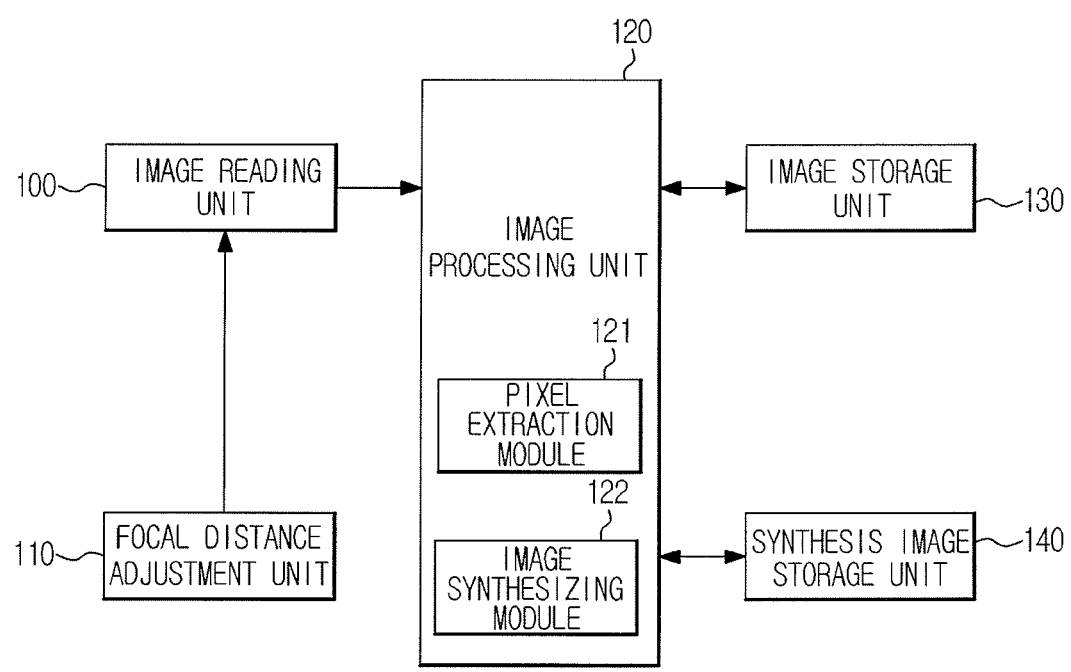
FIG. 5 is a block diagram schematically illustrating an image processing apparatus according to another embodiment of the present general inventive concept.

As illustrated in FIG. 5, the image processing apparatus according to this embodiment includes an image reading unit 100, a focal distance adjustment unit 110, an image processing unit 120, an image storage unit 130 and a synthesis image storage unit 140.

The image reading unit 100 includes the scanning unit 13, and reads the images of the manuscript by scanning the images according to each focal distance between the scanning unit 13 and the manuscript.

The focal distance adjustment unit 110 adjusts the focal distance of the manuscript by controlling the lens unit 16 of the scanning unit 13.

The image storage unit 130 stores the images of the manuscript in each focal distance, which are read by the image reading unit 100.

The image processing unit 120 stores the images of the manuscript read by the image reading unit 100 in the image storage unit 130, and generates synthesized images from the images of the manuscript, which are stored in the image storage unit 130, on the basis of spatial frequencies of corresponding pixels. The image processing unit 120 includes a pixel extraction module 121 and an image synthesizing module 122. The pixel extraction module 121 extracts pixels having the highest spatial frequency in the unit of pixel, or blocks having the highest spatial frequency in the unit of block. The pixel extraction module 121 includes an edge detection filter and may use a Laplacian filter, a high pass filter, an FFT (fast-Fourier transform) filter and the like. The image synthesizing module 122 synthesizes pixels or blocks extracted by the pixel extraction module 121 into a single image.

The synthesis image storage unit 140 stores the image synthesized by the image processing unit 120.

Figure 6:
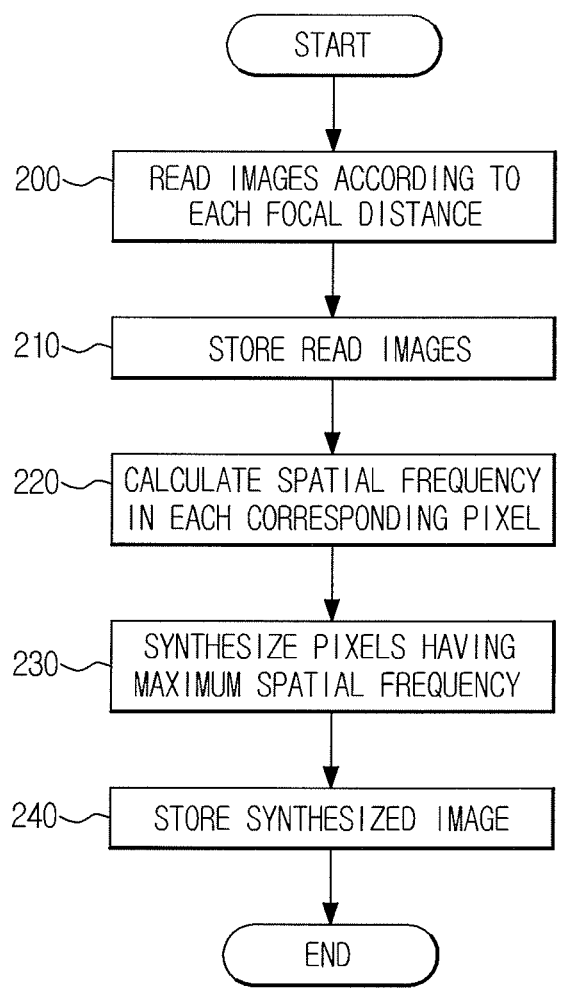
FIG. 6 is a flowchart illustrating a control method of an image processing apparatus according to another embodiment of the present general inventive concept.

As illustrated in FIG. 6, the image processing apparatus according to an embodiment of the present general inventive concept performs operations of reading images according to each focal distance (operation 200), storing the images according to each focal distance (operation 210), calculating a spatial frequency in each corresponding pixel of each stored image (operation 220), synthesizing pixels having the maximum spatial frequency (operation 230), and storing the synthesized image (operation 240). Through such processes, the image of the manuscript is scanned several times at various focal distances using a varifocal lens, and a synthesized image comprising only pixels having a clear picture quality in corresponding pixels is generated, so that the construction of the image processing apparatus can be simplified and the manufacturing cost thereof can be minimized while a clear image is being obtained.

Figure 7:
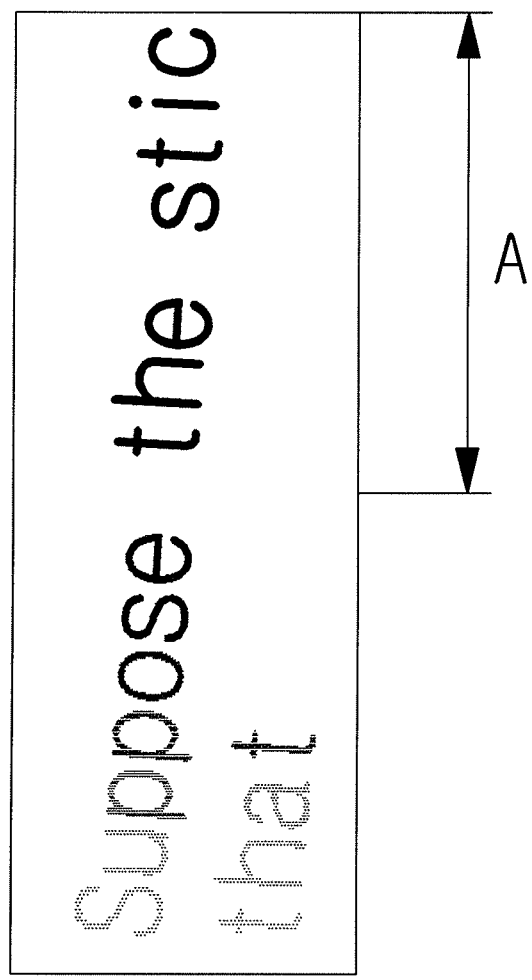
FIG. 7 is a view illustrating an image scanned at a first focal distance.
Figure 8:
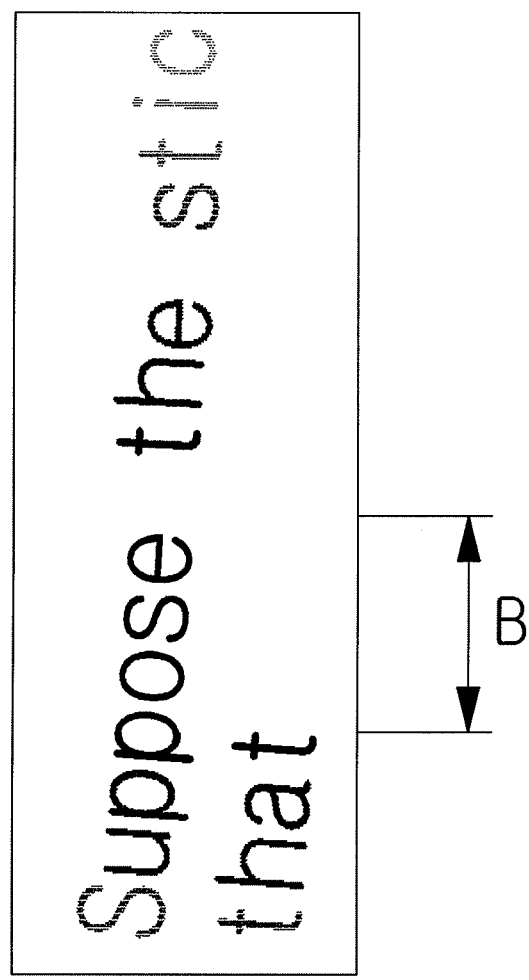
FIG. 8 is a view illustrating an image scanned at a second focal distance longer than the first focal distance of FIG. 7.
Figure 9:
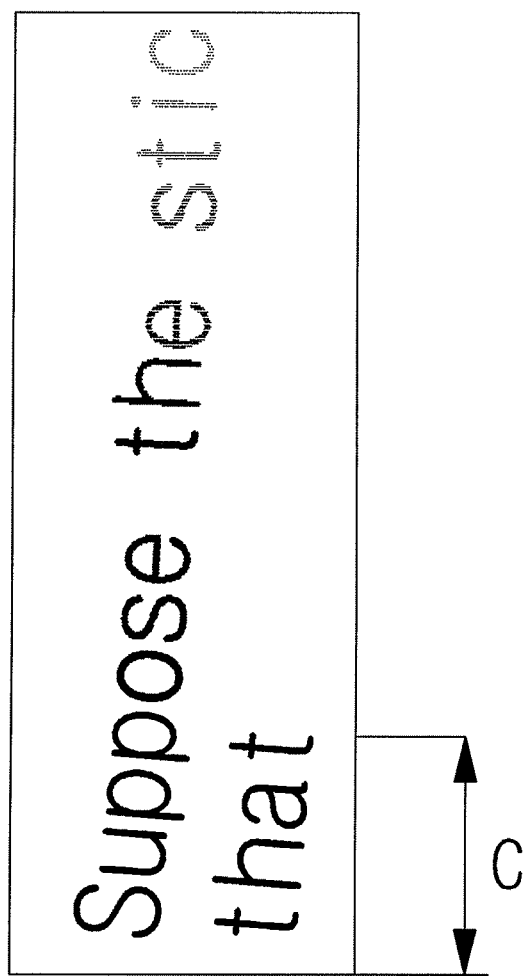
FIG. 9 is a view illustrating an image scanned at a third focal distance longer than the second focal distance of FIG. 8.

As described above, when a thick book is scanned, the scanning areas cannot be uniformly located within a fixed focal distance and the center of the book is located farthest from the lens unit 16. Thus, since the focal distance is inexact at the center region of the book, the characters become unclear gradually at the center region of the book. In order to obtain optimum output in such a situation, the image of the manuscript is scanned at various focal distances in operation 200. FIGS. 7 to 9 are views illustrating images scanned at focal distances different from each other, respectively. FIG. 7 is a view illustrating an image scanned at a first focal distance, FIG. 8 is a view illustrating an image scanned at a second focal distance longer than the first focal distance, and FIG. 9 is a view illustrating an image scanned at a third focal distance longer than the second focal distance. When the first to third focal distances are referred to as F1 to F3, respectively, the first focal distance F1 mates with the upper portion A of the image, the second focal distance F2 mates with the middle portion B of the image, and the third focal distance F3 mates with the lower portion C of the image. The scanned images are synthesized into an output image having the best picture quality through the image processing process. The image processing process can be performed by software and hardware.

After the images at each focal distance are scanned and stored in operations 200 and 210, energy (spatial frequency) of each image is calculated in pixel unit/block units in operation 220. The energy represents the amount of high frequency component included in pixels/blocks, and is expressed by a spatial frequency. When exact focusing is achieved, the edge of an image clearly appears than any other part. Thus, a pixel/block having the most exact focal distance has the greatest energy in the same pixel/block position. When calculating the value of the energy, an edge detection filter such as a Laplacian filter can be used. Further, a high pass filter, an FFT filter and the like can be used as the edge detection filter. The block may have a value of (m×n, m>1 and n>1). In such a case, the energy value is a sum of values obtained by performing filtering relative to all pixels in each block. When calculating the energy value, the accuracy of the value can be increased with reference to blocks around each block.

Figure 10:
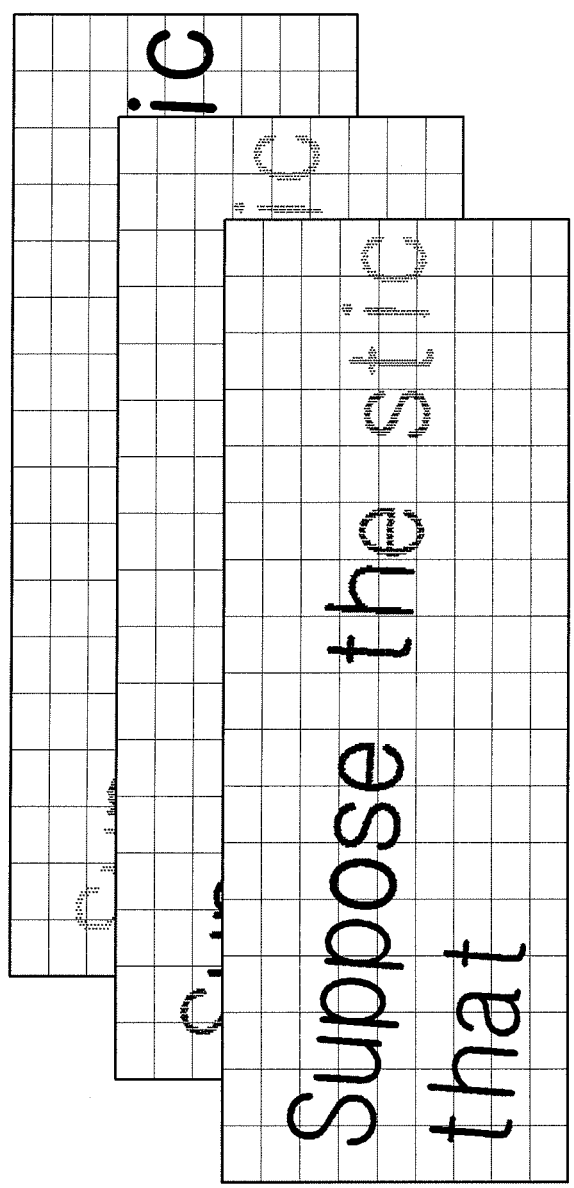
Figure 11:
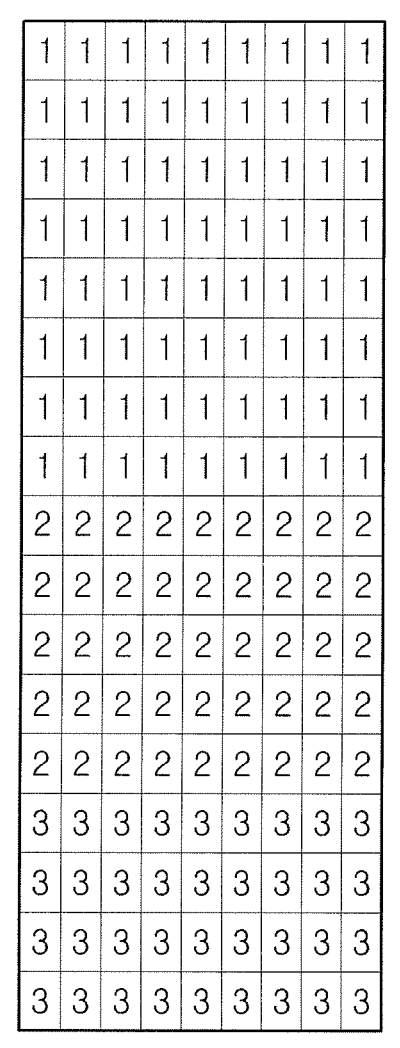
Figure 12:
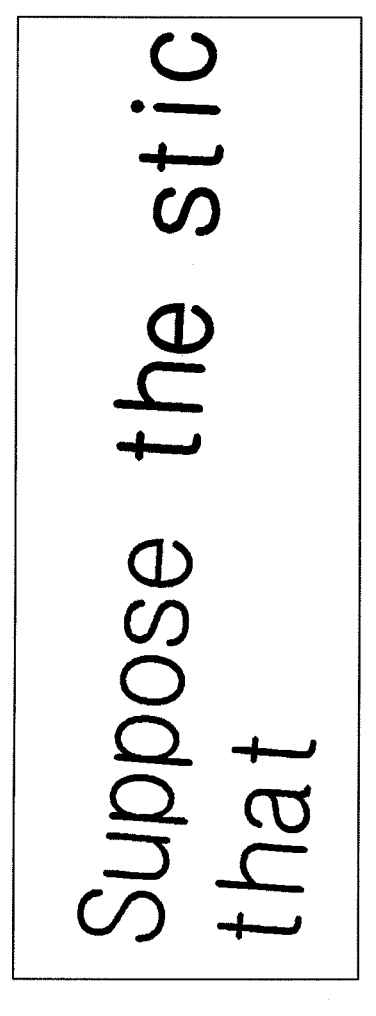

As illustrated in FIGS. 10 to 12, in operation 230, a map is created using numbers of images that have achieved optimum focusing in each pixel/block by using the calculated spatial frequency values for the pixel/block, and the images are synthesized using the map. As it can be seen from the synthesized image of FIG. 12, all parts of the image have clear picture quality.

In operation 240, the final synthesized image is copied and stored in the synthesis image storage unit 140 by selecting image data in each pixel/block from an image index indicated by an optimum F-map. When the synthesized image has a large block size, a step phenomenon may occur at the boundary area. Accordingly, a picture quality improvement process that post-processes the image can be performed using a low pass filter such as a Gaussian filter.

The final image processed as described above is output in the form of output data or is transmitted to a computer in the form of a JPEG file through additional image improvement algorithm and halftone.

The present general inventive concept can be realized as a method, an apparatus, and a system. When the present general inventive concept is manifested in computer software, components of the present general inventive concept may be replaced with code segments that are necessary to perform the required action. Programs or code segments may be stored in media readable by a processor, and transmitted as computer data that is combined with carrier waves via a transmission media or a communication network.

The media readable by a processor include anything that can store and transmit information, such as, electronic circuits, semiconductor memory devices, ROM, flash memory, EEPROM, floppy discs, optical discs, hard discs, optical fiber, radio frequency (RF) networks, etc. The computer data also includes any data that can be transmitted via an electric network channel, optical fiber, air, electromagnetic field, RF network, etc.

According to various embodiments of the present general inventive concept, the image of the manuscript is scanned several times at various focal distances, pixels having a clear picture quality in each corresponding pixel or block are extracted, and a synthesized image including only the extracted pixels is generated, so that the construction of the image processing apparatus can be simplified and the manufacturing cost thereof can be minimized while a clear image is being obtained.

Although various embodiments of the present general inventive concept have been illustrated and described, it would be appreciated by those skilled in the art that changes may be made in these embodiments without departing from the principles and spirit of the general inventive concept, the scope of which is defined in the appended claims and their equivalents.

What is claimed is:

1. An image processing apparatus comprising:
a flat glass to accommodate a manuscript laid thereon;
a focal distance adjustment unit to adjust a focal distance of the manuscript by controlling a lens;
an image reading unit disposed beneath the flat glass to read an image of the manuscript a plurality of times at respective various focal distances to obtain a plurality of different images such that each time the image is read the focal distance is fixed; and
an image processing unit to calculate a spatial frequency of each of the plurality of different images to determine which pixels have highest clearness among corresponding pixels, to extract the determined highest clearness pixels among corresponding pixels, and to synthesize the extracted pixels.

2. The image processing apparatus of claim 1, wherein the image processing unit comprises:
   a pixel extraction module to extract the pixels having highest clearness among the corresponding pixels from the plurality of different images; and
   an image synthesizing module to synthesize the pixels extracted by the pixel extraction module into a second image.

3. The image processing apparatus of claim 2, wherein the pixel extraction module extracts the pixels having a high spatial frequency in each corresponding pixel from the plurality of different images.

4. The image processing apparatus of claim 3, wherein the pixel extraction module extracts the pixels having a high spatial frequency by using one of a Laplacian filter, a high pass filter and an FFT filter.

5. The image processing apparatus of claim 2, wherein the pixel extraction module extracts the pixels having a high spatial frequency in each corresponding block from the plurality of different images.

6. The image processing apparatus of claim 5, wherein the pixel extraction module extracts the pixels having a high spatial frequency by using one of a Laplacian filter, a high pass filter and an FFT filter.

7. The image processing apparatus of claim 1, wherein the image processing unit further comprises a Gaussian filter that post-processes the synthesized image.

8. An image processing apparatus comprising:
   a flat glass to accommodate a manuscript laid thereon;
   an image reading unit disposed beneath the flat glass to read an image of the manuscript according to a preset focal distance;
   a focal distance adjustment unit to adjust the focal distance of the image reading unit;
   an image storage unit to store a plurality of first images obtained by reading the image a plurality of times at respective various focal distances such that each time the image is read the focal distance is fixed;
   an image processing unit to generate a second image obtained by calculating a spatial frequency of each of the plurality of first images to determine which pixels have highest clearness among corresponding pixels, extracting the determined highest clearness pixels, and synthesizing the extracted pixels.

9. The image processing apparatus of claim 8, wherein the image processing unit comprises a pixel extraction module that extracts the pixels having a high spatial frequency in each corresponding pixel from the plurality of first images.

10. The image processing apparatus of claim 8, wherein the image processing unit comprises a pixel extraction module that extracts the pixels having a high spatial frequency in each corresponding block from the first plurality of images.

11. The image processing apparatus of claim 8, wherein the image processing unit further comprises a low pass filter that performs low pass filtering relative to the second image.

12. The image processing apparatus of claim 11, wherein the low pass filter comprises a Gaussian filter.

13. A method of processing an image in an image processing apparatus comprising:
   adjusting a focal distance of the image by controlling a lens;
   reading the image a plurality of times at respective various focal distances through a flat glass upon which the image is laid to obtain a plurality of different first images such that each time the image is read the focal distance is fixed;
   storing the plurality of different first images;
   calculating a spatial frequency of each of the plurality of different first images to determine which pixels have highest clearness among corresponding pixels;
   extracting the determined highest clearness pixels;
   generating a second image by synthesizing the extracted pixels; and
   storing the second image.

14. The method of claim 13, wherein pixels having a high spatial frequency in each corresponding pixel are extracted from the plurality of different first images.

15. The method of claim 13, wherein pixels having a high spatial frequency in each corresponding block are extracted from the plurality of different first images.

16. The method of claim 13, wherein the second image is post-processed using a Gaussian filter.

17. A non-transitory computer readable storage medium containing an image processing method, the method comprising:
   adjusting a focal distance of the image by controlling a lens;
   reading a single image of a manuscript a plurality of times at respective various focal distances through a flat glass upon which the manuscript is laid to obtain a plurality of different first images such that each time the single image is read the focal distance is fixed;
   storing the plurality of different first images;
   calculating a spatial frequency of each of the plurality of different first images to determine which pixels have highest clearness among corresponding pixels;
   extracting the determined highest clearness pixels; and
   generating a second image by synthesizing the extracted pixels.

18. The non-transitory computer readable storage medium of claim 17, wherein the method further comprises:
   storing the second image.

19. The non-transitory computer readable storage medium of claim 17, wherein the pixel extraction is performed on pixels having a high spatial frequency in each corresponding pixel from the read images.

20. The non-transitory computer readable storage medium of claim 19, wherein the pixel extraction is performed using one of a Laplacian filter, a high pass filter and an FFT filter.

21. A method of processing an object image, the method comprising:
   adjusting a focal distance of the object image by controlling a lens;
   reading the object image a plurality of times at respective various focal distances through a flat glass upon which the object image is laid to obtain a plurality of different first images such that each time the object image is read the focal distance is fixed;
   storing the plurality of different first images;
   calculating a spatial frequency of each of the plurality of different first images to determine which pixels have highest clearness among corresponding pixels;
   extracting the determined highest clearness pixels; and
   generating synthesized images from the plurality of different first images, on the basis of the calculated spatial frequencies of corresponding pixels.

22. The method of claim 21, further comprising:
   storing at least one of the synthesized images.

23. The method of claim 21 wherein the pixel extraction is performed using one of a Laplacian filter, a high pass filter and an FFT filter.

\* \* \* \* \*